US010938501B2

(12) United States Patent
Ye et al.

(10) Patent No.: US 10,938,501 B2
(45) Date of Patent: Mar. 2, 2021

(54) METHOD AND DEVICE OF SIGNAL PROCESSING IN OPTICAL FIBER COMMUNICATION SYSTEMS

(71) Applicant: NOKIA SHANGHAI BELL CO., LTD., Shanghai (CN)

(72) Inventors: Chenhui Ye, Shanghai (CN); Xiaofeng Hu, Shanghai (CN); Kaibin Zhang, Shanghai (CN)

(73) Assignee: Alcatel Lucent, Nozay (FR)

( * ) Notice: Subject to any disclaimer, the term of this patent is extended or adjusted under 35 U.S.C. 154(b) by 115 days.

(21) Appl. No.: 16/315,769

(22) PCT Filed: Mar. 13, 2017

(86) PCT No.: PCT/CN2017/076465
§ 371 (c)(1),
(2) Date: Jan. 7, 2019

(87) PCT Pub. No.: WO2018/006616
PCT Pub. Date: Jan. 11, 2018

(65) Prior Publication Data
US 2020/0266914 A1 Aug. 20, 2020

(30) Foreign Application Priority Data
Jul. 8, 2016 (CN) .......................... 201610534604.3

(51) Int. Cl.
*H04J 14/08* (2006.01)
*H04B 10/25* (2013.01)
(Continued)

(52) U.S. Cl.
CPC .............. *H04J 14/08* (2013.01); *H04B 10/25* (2013.01); *H04B 10/50* (2013.01); *H04B 10/66* (2013.01);
(Continued)

(58) Field of Classification Search
CPC .... H04B 10/2575; H04B 10/25; H04B 10/50; H04B 10/66; H04B 10/25759;
(Continued)

(56) References Cited

U.S. PATENT DOCUMENTS

| 4,928,272 A | * | 5/1990 | Ohue | ..................... | H04N 7/173 |
| | | | | | 348/E7.069 |
| 5,400,163 A | * | 3/1995 | Mizuochi | .................. | H04J 3/12 |
| | | | | | 348/E7.024 |

(Continued)

FOREIGN PATENT DOCUMENTS

| CN | 102308546 A | 1/2012 |
| CN | 102611668 A | 7/2012 |

(Continued)

OTHER PUBLICATIONS

Yikai Su et al., "Optical VPN in Pon Using TDM-FDM Signal Format", OSA/OFC 2006 (Year: 2006).*

(Continued)

*Primary Examiner* — Abbas H Alagheband
(74) *Attorney, Agent, or Firm* — Harness, Dickey & Pierce, P.L.C.

(57) ABSTRACT

Embodiments of the present disclosure provide a method and device of signal processing in optical fiber communication systems. The method includes dividing electrical signals for a plurality of receivers in the optical fiber communication system into a plurality of groups, the plurality of groups each being associated with at least one of the plurality of receivers. The method also includes obtaining time-domain multiplexed signals by multiplexing the electrical signals in the plurality of groups in time domain. The method also includes multiplexing the time-domain multiplexed signals in the plurality of groups in frequency domain such that the time-domain multiplexed signals occupy respective sub-bands of a transmission bandwidth for the (Continued)

optical fiber communication system. The method also includes converting the frequency-domain multiplexed signals into analog optical signals for transmission.

12 Claims, 7 Drawing Sheets

(51) Int. Cl.
*H04B 10/50* (2013.01)
*H04B 10/66* (2013.01)
*H04J 99/00* (2009.01)
*H04B 10/2507* (2013.01)
*H04B 10/071* (2013.01)

(52) U.S. Cl.
CPC ............ *H04J 15/00* (2013.01); *H04B 10/071* (2013.01); *H04B 10/2507* (2013.01)

(58) Field of Classification Search
CPC .... H04Q 11/0001; H04Q 11/02; H04Q 11/04; H04Q 11/00; H04J 14/08; H04J 15/00; H04W 88/085
USPC .......................................................... 398/98
See application file for complete search history.

(56) References Cited

U.S. PATENT DOCUMENTS

| | | | | |
|---|---|---|---|---|
| 6,016,426 A * | 1/2000 | Bodell | ............. | H04B 10/25759 455/422.1 |
| 7,154,914 B1 * | 12/2006 | Pechner | .............. | H04J 14/0298 370/516 |
| 7,369,617 B2 * | 5/2008 | Powell | .................. | H04L 1/0041 375/259 |
| 9,225,452 B2 * | 12/2015 | Kim | .......................... | H04L 5/06 |
| 9,907,064 B2 * | 2/2018 | Saito | .................... | H04W 72/042 |
| 10,742,321 B2 * | 8/2020 | Wang | .................... | H03M 3/458 |
| 2008/0025511 A1 * | 1/2008 | Fuse | ........................ | H04K 1/02 380/256 |
| 2009/0122752 A1 * | 5/2009 | Nishio | .................. | H04L 5/0037 370/329 |
| 2010/0021166 A1 * | 1/2010 | Way | .................... | H04J 14/0256 398/79 |
| 2010/0028002 A1 * | 2/2010 | Qian | .................... | H04J 14/0227 398/79 |
| 2014/0003819 A1 * | 1/2014 | Cho | ....................... | H04L 5/0048 398/96 |
| 2014/0169239 A1 * | 6/2014 | Maaref | ............. | H04W 72/0446 370/280 |
| 2017/0033863 A1 * | 2/2017 | Zhou | .................... | H04B 10/071 |
| 2018/0242031 A1 * | 8/2018 | Hardin | ............... | H04N 21/2393 |

FOREIGN PATENT DOCUMENTS

| | | |
|---|---|---|
| CN | 103026678 A | 4/2013 |
| CN | 105009502 A | 10/2015 |
| EP | 2608436 A1 | 6/2013 |
| EP | 2670103 A1 | 12/2013 |
| EP | 2959628 A1 | 12/2015 |
| JP | 2011082908 A | 4/2011 |
| JP | 2014075751 A | 4/2014 |
| JP | 2015213227 A | 11/2015 |
| JP | 2016054412 A | 4/2016 |
| WO | WO-2012/016547 A1 | 2/2012 |

OTHER PUBLICATIONS

Ca Office Action dated Mar. 3, 2020, issued in corresponding Japanese Patent Application No. 2019-500398.

J. Zhang et al., 'Full-duplex Asynchronous Quasi-Gapless Carrier-Aggregation using Filter-bank Multi-carrier in MMW Radio-over-Fiber Heterogeneous Mobile Access Networks' *Optical Fiber Communication Conference*, Mar. 2016.

X. Liu et al., 'CPRI-Compatible Efficient Mobile Fronthaul Transmission via Equalized TDMA Achieving 256 Gb/s CPRI-Equivalent Data Rate in a Single 10-GHz-Bandwidth IM-DD Channel' *Optical Fiber Communication Conference*, Mar. 2016.

International Search Report for PCT International Applicaion No. PCT/CN2017/076465 dated May 31, 2017.

Office Action dated Apr. 21, 2020, issued in corresponding Korean Application No. 10-2019-7003266.

Office Action for corresponding Chinese Application No. 201610534604.3 dated Mar. 1, 2019.

Extended European Search Report dated Nov. 2, 2020 issued in corresponding European Appln. No. 17823429.0.

\* cited by examiner

METHOD AND DEVICE OF SIGNAL PROCESSING IN OPTICAL FIBER COMMUNICATION SYSTEMS

CROSS-REFERENCE TO RELATED APPLICATIONS

This application is a national phase under 35 U.S.C. § 371 of PCT International Application No. PCT/CN2017/076465, filed Mar. 13, 2017, which further claims priority to Chinese Application No. 201610534604.3, filed Jul. 8, 2016.

FIELD

Embodiments of the present disclosure generally relate to communication technologies, and more specifically to a method and device of signal processing in optical fiber communication systems.

BACKGROUND

In a distributed small cell system having a ultra large density, analog fronthaul technology is widely used, and it is a common choice for indoor wireless access and transmitting signals through a fixed network architecture, for example, using an optical fiber communication system as the fixed network architecture. The distributed small cell system having the ultra large density requires a large optical power split ratio to support large-capacity data transmission. However, there is currently no mature available solution for implementing the large-capacity data transmission in a reliable and cost-effective manner.

SUMMARY

Embodiments of the present disclosure provide a method and device of signal processing in optical fiber communication systems.

In a first aspect, embodiments of the present disclosure provide a signal processing method in an optical fiber communication system. The method comprises: dividing electrical signals for a plurality of receivers in the optical fiber communication system into a plurality of groups, the plurality of groups each being associated with at least one of the plurality of receivers. The method also comprises: obtaining time-domain multiplexed signals by multiplexing the electrical signals in the plurality of groups in time domain. The method also comprises: multiplexing the time-domain multiplexed signals in the plurality of groups in frequency domain such that the time-domain multiplexed signals occupy respective sub-bands of a transmission bandwidth for the optical fiber communication system. The method also comprises: converting the frequency-domain multiplexed signals into analog optical signals for transmission.

In a second aspect, embodiments of the present disclosure provide a signal processing method in an optical fiber communication system. The method comprises: receiving training optical signals from a transmitter in the optical fiber communication system. The method also comprises: converting the training optical signals into training electrical signals having nonlinear modulation characteristics. The method also comprises: converting the training electrical signals into optical signals. The method also comprises: transmitting the optical signals to the transmitter for training and learning of a nonlinear channel response.

In a third aspect, embodiments of the present disclosure provide a signal processing device in an optical fiber communication system. The device comprises a group dividing unit, a time-domain multiplexing unit, a frequency-domain multiplexing unit and an electric-optical converting unit. The group dividing unit is configured to divide electrical signals for a plurality of receivers in the optical fiber communication system into a plurality of groups, the plurality of groups each being associated with at least one of the plurality of receivers. The time-domain multiplexing unit is configured to obtain time-domain multiplexed signals by multiplexing the electrical signals in the plurality of groups in time domain. The frequency-domain multiplexing unit is configured to multiplex the time-domain multiplexed signals in the plurality of groups in frequency domain such that the time-domain multiplexed signals occupy respective sub-bands of a transmission bandwidth for the optical fiber communication system. The electric-optical converting unit is configured to convert the frequency-domain multiplexed signals into analog optical signals for transmission.

In a fourth aspect, embodiments of the present disclosure provide a signal processing device in an optical fiber communication system. The device comprises a receiving unit, an optical-electro converting unit, an electro-optical converting unit and a transmitting unit. The receiving unit is configured to receive training optical signals from a transmitter in the optical fiber communication system. The optical-electro converting unit is configured to is configured to convert the training optical signals into training electrical signals having nonlinear modulation characteristics. The electro-optical converting unit is configured to convert the training electrical signals into optical signals. The transmitting unit is configured to transmit the optical signals to the transmitter for training and learning of a nonlinear channel response and for guiding the nonlinear pre-compensation.

BRIEF DESCRIPTION OF THE DRAWINGS

Through the following detailed description with reference to the accompanying drawings, the above and other features, advantages and aspects of example embodiments of the present disclosure will become more apparent. In the drawings, identical or similar reference numbers represent the same or similar elements, in which.

DETAILED DESCRIPTION OF EMBODIMENTS

Embodiments of the present disclosure will be described with reference to the drawings in detail. It is to be understood that the drawings and implementations are only for the purpose of example, rather than to limit the scope of protection of the present disclosure.

Figure 1:
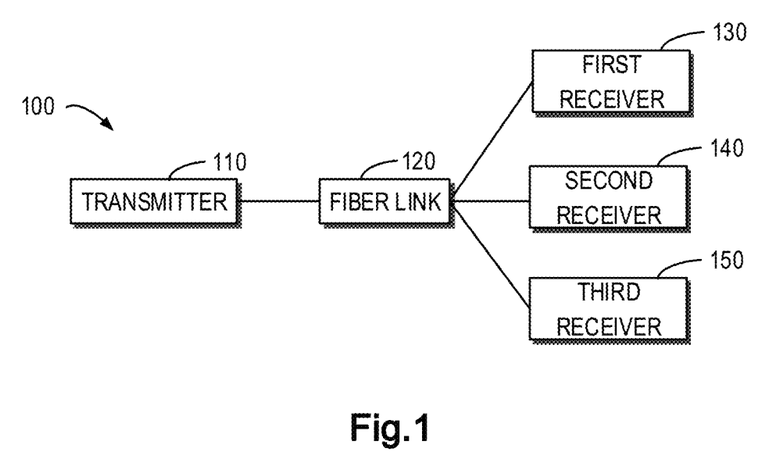
FIG. 1 shows an architectural block diagram of an optical fiber communication system in accordance with an embodiment of the present disclosure.

FIG. 1 shows an architectural block diagram of an optical fiber communication system 100 in accordance with an embodiment of the present disclosure. The optical fiber communication system 100 includes a transmitter 110, a fiber link 120, a first receiver 130, a second receiver 140, and a third receiver 150. The transmitter 110 can communicate with the first receiver 130, the second receiver 140, and the third receiver 150 via the fiber link 120. Since there is one transmitter and multiple receivers in the architecture as shown in FIG. 1, the architecture is referred to as a "point-to-multipoint" architecture.

In some embodiments, the optical fiber communication system 100 can be implemented as a distributed small cell system, such as a very large density distributed small cell system. In such an embodiment, the transmitter 110 may be implemented as an optical line terminal (OLT), the receivers 130, 140 and 150 may be implemented as optical network unit (ONU) at a small cell site, the fiber link 120 may be implemented as an optical distribution network, the optical distribution network may be a point to multipoint network such as a passive optical network (PON). Of course, this is not limiting, and any "point-to-multipoint" architecture currently known or developed in the future can be used in conjunction with embodiments of the present disclosure.

It should be understood that the optical fiber communication system 100 is illustrated in FIG. 1 as including three receivers 130, 140, and 150, and the scope of embodiments of the present disclosure is not limited thereto. Depending on the specific application scenario, there may be any suitable number of receivers.

Currently, in order to converge signals for a plurality of receivers (e.g., receivers 130, 140, and 150) in the fiber link 120, a Time Division Multiplexing (TDM) manner is typically employed at the transmitter 110. According to the TDM manner, the time required for transmission is reduced by increasing the bandwidth for transmitting signals for each receiver, so that signals for the plurality of receivers can be transmitted during the transmission period provided to the transmitter 110. It can be seen that the signals transmitted by the transmitter 110 are wideband signals when the TDM manner is used. For example, the bandwidth of the wideband signals is in the range of 1 GHz to 4 GHz.

In order to obtain the signals of the entire bandwidth, the receivers 130, 140 and 150 each need to be equipped with a wideband Analog to Digital Converter (ADC). The bandwidth of currently available wideband ADCs is, for example, in the range of 500 MHz to 1 GHz. Therefore, if the bandwidth of the signals transmitted by the transmitter 110 exceeds 1 GHz, the receivers 130, 140, and 150 will not be able to acquire the signals of the entire bandwidth, thereby causing communication failure.

On the other hand, the price of a wideband ADC is expensive. In a very large density distributed small cell system (i.e., a system with a large number of receivers), if an expensive wideband ADC is provided at each small cell site, the deployment cost will be increased.

To solve the above and other deficiencies and potential problems of the prior scheme, according to embodiments of the present disclosure, the transmitter 110 employs a Frequency-Time Division Multiplexing (F-TDM) manner when transmitting signals. According to this F-TDM manner, signals for the receivers 130, 140 and 150 occupy respective sub-bands of a transmission bandwidth. Accordingly, the receivers 130, 140, and 150 need only use a low-cost intermediate frequency ADC to acquire signals in the respective sub-bands, thereby reducing the deployment cost of the receivers.

Figure 2:
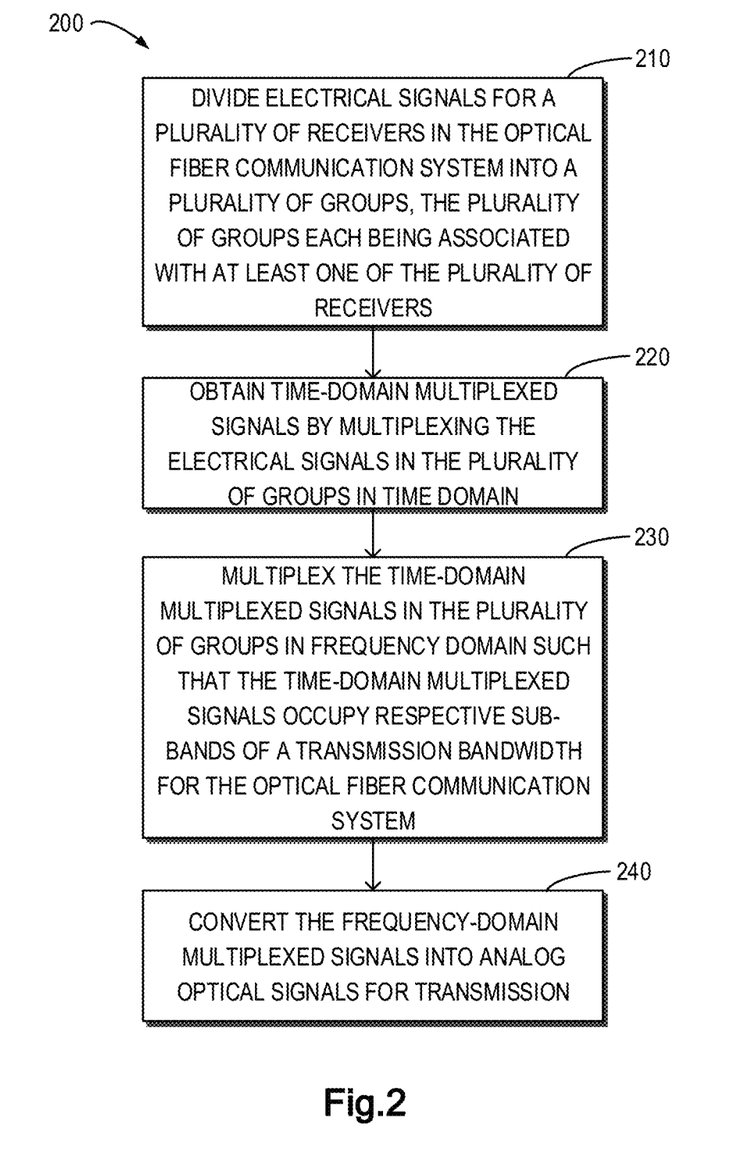
FIG. 2 shows a flow chart of a signal processing method in an optical fiber communication system in accordance with a first aspect of the present disclosure.

FIG. 2 shows a flow chart 200 of a signal processing method in an optical fiber communication system in accordance with a first aspect of the present disclosure. In some embodiments, the method 200 can be implemented, for example, by the transmitter 110. It should be understood that the method 200 may also include additional steps not shown and/or the steps shown may be omitted. The scope of the embodiments of the present disclosure is not limited in this respect.

In step 210, electrical signals for the receivers 130, 140 and 150 in the optical fiber communication system 100 are divided into a plurality of groups, the plurality of groups each is associated with at least one of the receivers 130, 140 and 150. The number of the plurality of groups may be equal to or less than the number of the receivers. For example, in some embodiments, the electrical signals for the receivers 130, 140, and 150 can be divided into three groups, each of which is associated with one of the receivers 130, 140, and 150. In other embodiments, the electrical signals for the receivers 130, 140, and 150 can be divided into two groups, one of the two groups is associated with both of the receivers 130, 140, another of the two groups is associated with the receiver 150. It should be understood that the group dividing and association manners described above are merely exemplary and are not intended to limit the embodiments of the present disclosure. In other embodiments, other dividing and association methods are also possible.

In step 220, time-domain multiplexed signals is obtained by multiplexing the electrical signals in the plurality of groups in time domain. It will be appreciated that in embodiments in which each of the groups is associated with one receiver, electrical signals in the group for the receiver will be multiplexed in the time domain in step 220. In an embodiment in which each of the groups is associated with more than two receivers, electrical signals in the group for the receivers will be multiplexed in the time domain in step 220. For example, in an embodiment where the electrical signals for the receivers 130, 140, and 150 are divided into two groups, and one of the two groups is associated with both of the receivers 130, 140, The electrical signals in the group for the receiver 130 and the electrical signals in the group for the receiver 140 are multiplexed in the time domain in step 220.

In step 230, the time-domain multiplexed signals in the plurality of groups are multiplexed in frequency domain such that the time-domain multiplexed signals occupy respective sub-bands of a transmission bandwidth for the optical fiber communication system 100. In other words, the signals for the receivers 130, 140 and 150 occupy respective sub-bands of the transmission bandwidth, instead of the entire transmission bandwidth. Therefore, the receivers 130, 140, and 150 each only need to use the intermediate frequency (IF) ADC to acquire signals in the respective sub-bands. Thus, the situation that the receivers cannot obtain the signals of the entire bandwidth may be avoided, and the reliability of the signal transmission is improved. In addition, since the receivers 130, 140, and 150 each employ a low-cost IF ADC, the deployment cost of the receivers is reduced, especially the deployment cost of a ultra-large density distributed small cell system.

In step 240, the frequency-domain multiplexed signals are converted into analog optical signals for transmission. In some embodiments, the electrical signals can be converted to the optical signals using intensity modulation, which can be direct modulation or external modulation. Of course, this is only an example. It should be understood that any technique for converting an electrical signal into an optical signal can be used in conjunction with embodiments of the present disclosure, whether currently known or developed in the future.

Figure 3:
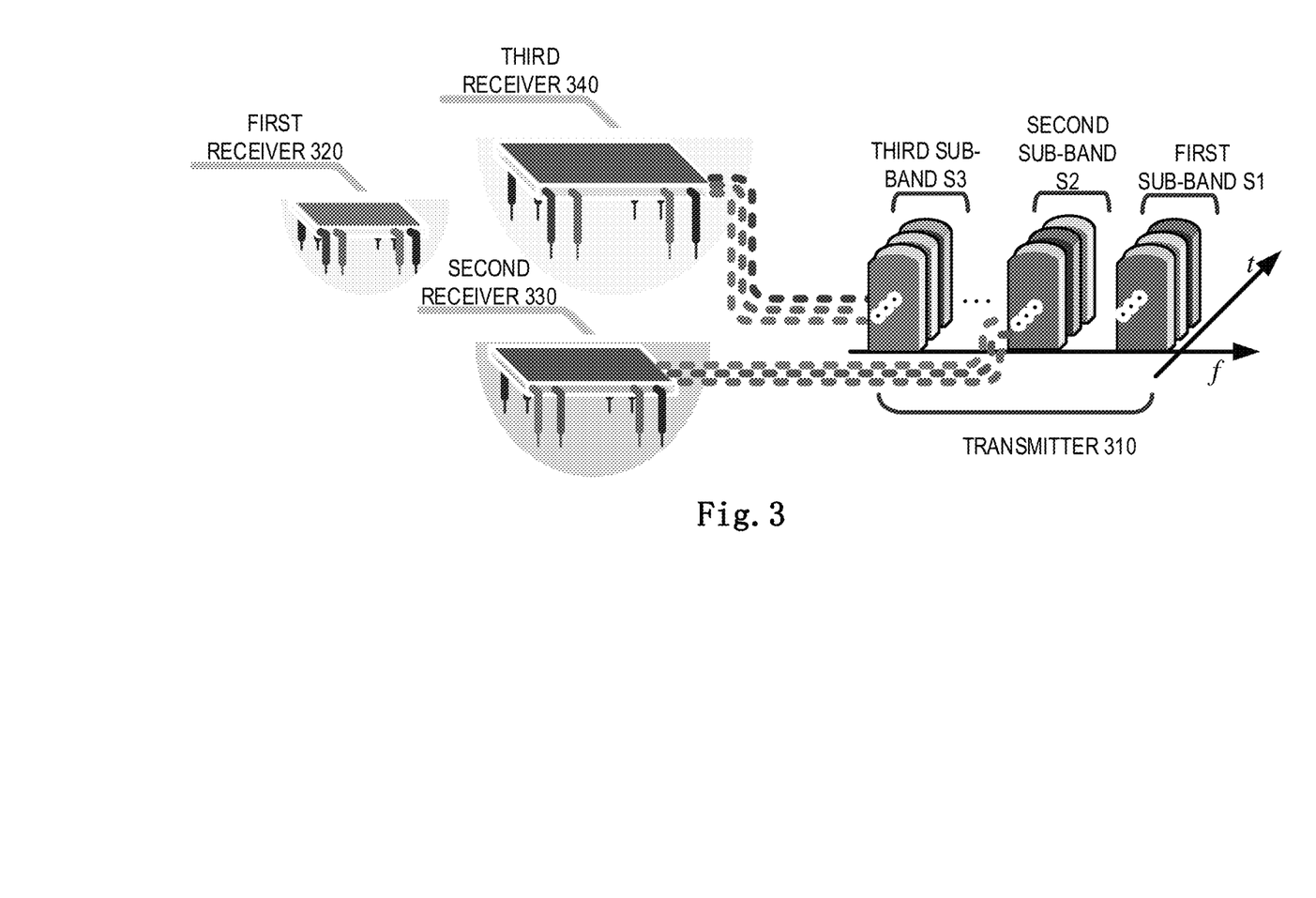
FIG. 3 shows a signal multiplexing manner in accordance with an embodiment of the present disclosure.

FIG. 3 shows an F-TDM manner in accordance with an embodiment of the present disclosure. As shown, the transmitter 310 divides electrical signals for receivers 320, 330 and 340 into three groups. Each of the three groups is associated with one of the receivers 320, 330 and 340.

Time-domain multiplexed signals are obtained by multiplexing the electrical signals in the three groups in time domain as shown by the time axis (t). The time-domain multiplexed signals in the three groups are multiplexed in frequency domain such that the time-domain multiplexed signals occupy respective sub-bands of a transmission bandwidth for the optical fiber communication system. Specifically, as indicated by the frequency axis (f), the time-domain multiplexed signals for the first receiver 320, the second receiver 330, and the third receiver 340 occupy a first sub-band S1, a second sub-band S2, and a third sub-band S3, respectively. Thus, the receivers 320, 330, and 340 each need only use the intermediate frequency ADC to acquire signals in the respective sub-bands without acquiring signals of the entire transmission bandwidth including the sub-bands S1, S2, and S3. Therefore, the reliability of signal transmission is improved and the deployment cost of the small cell site where the receivers are located is reduced.

Since the time-domain multiplexed signals for the first receiver 320, the second receiver 330, and the third receiver 340 occupy the first sub-band S1, the second sub-band S2, and the third sub-band S3, respectively, instead of the entire transmission bandwidth, in some embodiments, the transmitter 110 may transmit control information to the receivers 320, 330, and 340 to at least indicate frequency-domain resources for transmitting signals in the respective sub-bands.

Moreover, in some embodiments, the electrical signals for the first receiver 320, the second receiver 330, and the third receiver 340 can be divided into two groups at the transmitter 310, one of the two groups are associated both of the receivers 320 and 330, and the other of the two groups is associated with receiver 340. Subsequently, the time-domain multiplexed signals are obtained by multiplexing the electrical signals in the two groups in the time domain. Then, the time-domain multiplexed signals in the two groups are multiplexed in frequency domain, such that the time-domain multiplexed signals for the receivers 320 and 330 occupy the first sub-band S1, the time-domain multiplexed signal for the receiver 340 occupies the second sub-band S2. Since the time-domain multiplexed signals for both of the receivers 320 and 330 are included in the sub-band S1, in order to enable the receivers 320 and 330 to extract signals for themselves from the sub-band S1, the transmitter 110 can transmit the respective control information to the receivers 320 and 330 so as to indicate time-domain resources for transmitting signals for the respective receivers in the sub-band S1. Of course, this is only an example. It should be understood that the transmitter 110 may indicate to the receivers, in any suitable manner, frequency and/or time domain resources for transmitting signals in the respective sub-bands.

As is known, nonlinear impairments (such as optical signal-to-noise ratio degradation, nonlinear distortion, etc.) have a greater impact on analog transmission systems. Nonlinear impairments are typically introduced by a modulator at the transmitter 110. When an amplitude of an input signal of the modulator is above a predetermined threshold, the relationship between its input signal and the output signal will be non-linear. This non-linear relationship in turn causes the response of the channel to be non-linear. For example, the nonlinear response of a channel can be expressed as follows:

$$H\left(\omega, \sum_{i=1}^{N} |A_i(t)|^2\right), \quad (1)$$

where $A_i$ represents an amplitude of the signal in the $i^{th}$ sub-band, $\omega$ represents the spectral component, and N represents the number of sub-bands.

As can be seen from expression (1), the nonlinear response of the channel is not only frequency selective, but also depends on the sum of the amplitudes of the signals on all frequency channels. For ease of nonlinear compensation, a channel can be decomposed into a frequency-domain channel and a time-domain channel, the nonlinear compensation is performed on the frequency-domain channel and the time-domain channel respectively. For example, the expression (1) can approximated as follows:

$$H_i\left(\omega, \sum_{i=1}^{N} |A_i(t)|^2\right) \approx H_{1i}(\omega) \cdot H_2\left(\sum_{i=1}^{N} |A_i(t)|^2\right) \quad (2)$$

where $H_i\left(\omega, \sum_{i=1}^{N} |A_i(t)|^2\right)$ represents a channel response of the $i^{th}$ sub-band, $H_{1i}(\omega)$ represents a frequency-domain channel response of the $i^{th}$ sub-band, $$H_2\left(\sum_{i=1}^{N} |A_i(t)|^2\right)$$

represents a time-domain channel response of the $i^{th}$ sub-band.

It will be appreciated that in a "point-to-multipoint" architecture such as that shown in FIG. 1, the transmitter 110 needs to process signals to or from multiple receivers (e.g., receivers 130, 140, and 150), while the receivers only need to process signals related to themselves. Therefore, it is necessary to configure the signal processing capability of the transmitter to be stronger than the receivers. Furthermore, it can be seen from the above expression (1) that the nonlinear response of the channel depends on the sum of the amplitudes of the signals over the entire bandwidth. However, the receivers each only process the signals in the sub-bands associated with themselves, but are unaware of the signals in the other sub-bands, and thus do not know the sum of the amplitudes of the signals over the entire bandwidth. In view of above, nonlinear pre-compensation on the signals to be transmitted by the transmitter 110 would be a better choice.

Moreover, the transmitter 110 is unaware of how the signals are subjected to non-linear impairment. That is, the transmitter 110 is unaware of the signals received by the receivers 130, 140, and 150. Thus, in accordance with an embodiment of the present disclosure, a signal feedback function is incorporated at the receivers to assist the transmitter in performing nonlinear pre-compensation.

A nonlinear compensation process according to an embodiment of the present disclosure will now be described with reference to FIG. 4. It will be appreciated that a method 400 as illustrated in FIG. 4 can be considered as an example implementation of the method 200.

Figure 4:
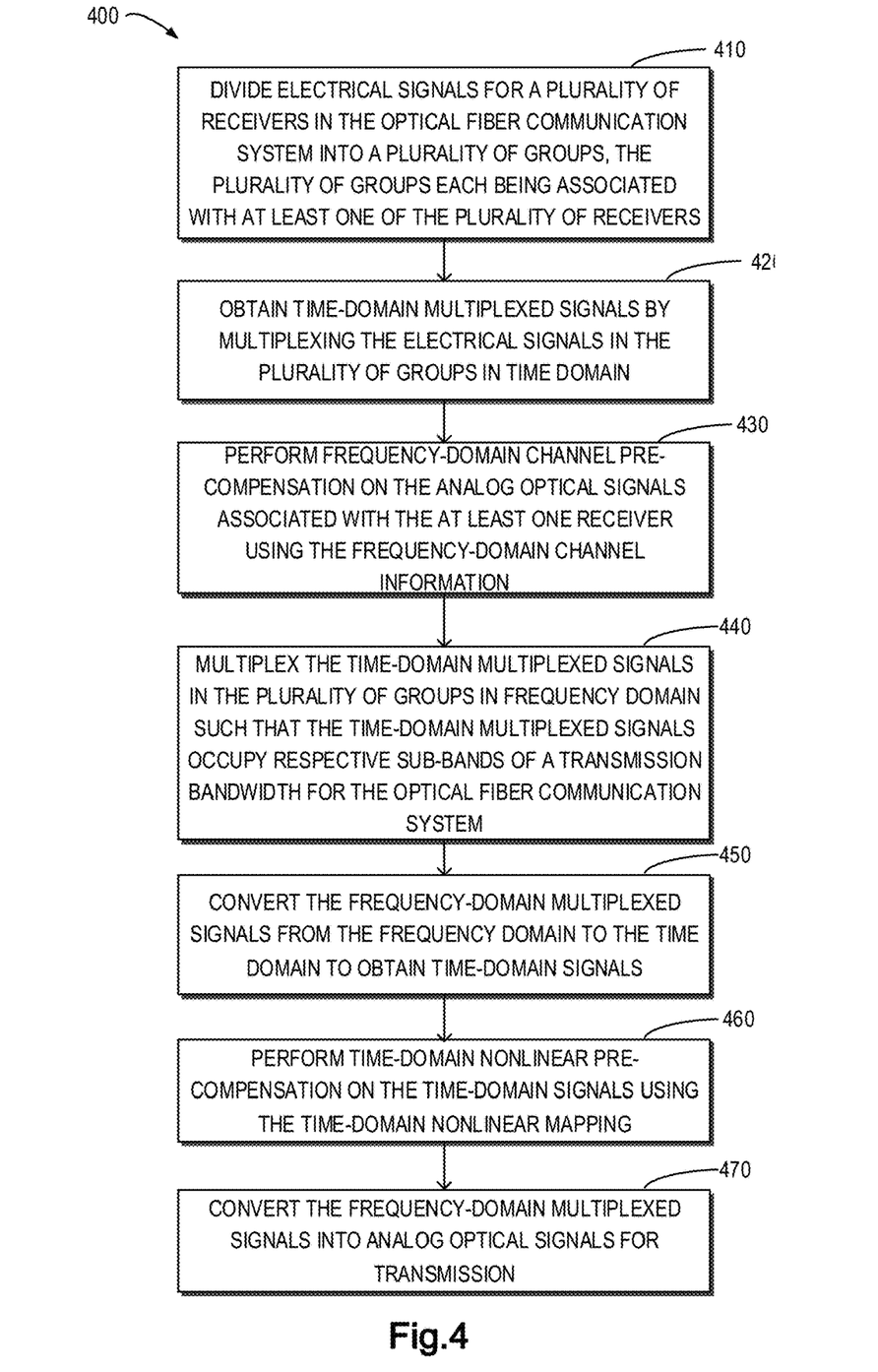
FIG. 4 shows a flow chart of a signal processing method in an optical fiber communication system in accordance with some embodiments.

As shown in FIG. 4, the method 400 begins in step 410 in which electrical signals for the receivers 130, 140 and 150 in the optical fiber communication system 100 are divided into a plurality of groups, the plurality of groups each is associated with at least one of the receivers 130, 140 and 150. Step 410 corresponds to step 210 in the above, and details of the step 410 are not described herein again.

In step 420, time-domain multiplexed signals is obtained by multiplexing the electrical signals in the plurality of groups in time domain. Step 420 corresponds to step 220 in the above, and details of the step 410 are not described herein again.

In step 430, frequency-domain channel pre-compensation is performed on the electrical signals for the at least one of the receivers 130, 140 and 150 using the frequency-domain channel information. It will be appreciated that in order to avoid the effects of non-linear impairment on the individual sub-bands of the transmission bandwidth, the frequency-domain channel pre-compensation may be performed on the electrical signal for each of the receivers 130, 140 and 150.

In some embodiments, the frequency-domain channel information may be acquired in advance for use in the frequency-domain channel pre-compensation by means of a signal feedback function of a receiver. It should be appreciated that, since each of the plurality of receiver is capable of processing only the signal in a respective sub-band associated with the respective receiver, in the case where frequency domain channel pre-compensation is performed for each sub-band, it needs to obtain frequency-domain channel information associated with the respective sub-bands from the plurality of receivers, respectively.

Take the first receiver 320 in FIG. 3 as an example. In order to obtain frequency-domain channel information for frequency domain channel pre-compensation for the first sub-band S1 from the first receiver 320, the transmitter 310 may transmit a first training optical signal to the first receiver 320, and the first training optical signal occupies the first sub-band S1 associated with the first receiver 320. The first training optical signal can be obtained by converting a training sequence known in advance by the receiver 320 from an electrical signal to an optical signal.

It is worth noting that in order to ensure that the modulator does not introduce nonlinear impairments in the process of acquiring frequency-domain channel information, the driver amplitude of the modulator at the first receiver 320 needs to be kept below a linear threshold amplitude.

Then, the transmitter 310 receives feedback from the first receiver 320 for the first training optical signal. The feedback from the first receiver 320 for the first training optical signal transmitted by the transmitter 310 has a linear modulation characteristic since it is ensured that the modulator at the transmitter 310 does not introduce nonlinear impairments. The transmitter 310 then obtains frequency-domain channel information from the feedback. In some embodiments, the transmitter 310 can determine the frequency-domain channel response by performing frequency-domain equalization on the feedback, and then obtain the frequency-domain channel information from the frequency-domain channel response. As a non-limiting implementation, the frequency-domain equalization is implemented using a "one-tap equalization" method. Of course, this is not limiting, and any frequency-domain equalization method currently known or developed in the future can be used in conjunction with embodiments of the present disclosure.

It can be understood that the frequency-domain channel response determined by the transmitter 310 according to the feedback includes a sum of a downlink frequency-domain channel response (from the transmitter 310 to the receiver 320) and an uplink frequency-domain channel response (from the receiver 320 to the transmitter 310), and the required frequency-domain channel information is only related to the downlink frequency-domain channel response. Therefore, the uplink frequency-domain channel response needs to be removed from the sum.

As described above, the first training optical signal transmitted by the transmitter 310 can be obtained by converting a training sequence known in advance by the receiver 320 from an electrical signal into an optical signal. Therefore, in order to obtain the uplink frequency-domain channel response, the receiver 320 can convert the previously known training sequence from an electrical signal to an optical signal and transmit it to the transmitter 310. Thus, the transmitter 310 can acquire the desired uplink frequency-domain channel response from the received optical signal. Thereafter, the transmitter 310 removes the uplink frequency-domain channel response from the above sum to obtain the desired downlink frequency-domain channel response. In turn, the transmitter 310 can obtain the required frequency-domain channel information, such as the amplitude and phase of the downlink frequency-domain channel response, from the downlink frequency-domain channel response.

Continue to refer to FIG. 4, in step 440, the time-domain multiplexed signals in the plurality of groups are multiplexed in frequency domain such that the time-domain multiplexed signals occupy respective sub-bands of the transmission bandwidth for the optical fiber communication system 100. Step 440 corresponds to step 230 as described above, and details of the step 440 are not described herein again.

In step 450, the frequency-domain multiplexed signals are converted from the frequency domain to the time domain to obtain time-domain signals. In some embodiments, the frequency-domain multiplexed signal can be converted from the frequency-domain to the time domain using an Inverse Fast Fourier Transform (iFFT). Of course, this is not limiting, and any frequency-domain to time domain transform method currently known or developed in the future can be used in conjunction with embodiments of the present disclosure.

In step 460, the time-domain nonlinear pre-compensation is performed on the time-domain signals using time-domain nonlinear mapping. According to an embodiment of the present disclosure, the time-domain nonlinear mapping indicates a mapping relationship between measured strengths of the electrical signals and strength compensations. In some embodiments, the time-domain nonlinear mapping can be implemented as a time-domain nonlinear mapping table. Alternatively or additionally, in other embodiments, the time-domain nonlinear mapping may also be implemented in the form of matrices, vectors, functions. The scope of the disclosure is not limited in this respect.

In some embodiments, similar to frequency-domain channel pre-compensation, the time-domain nonlinear mapping can be pre-established for electrical signals by means of the signal feedback function of the receivers for time-domain nonlinear pre-compensation.

The first receiver 320 in FIG. 3 is still taken as an example. In order to establish a time-domain nonlinear mapping, the transmitter 310 can transmit a second plurality of training optical signals to the first receiver 320. In some embodiments, the transmitter 310 can continuously transmit the second plurality of training optical signals to the first receiver 320. In other embodiments, the transmitter 310 can transmit the second plurality of training optical signals to the first receiver 320 at a predetermined time interval (e.g., 1 second). The scope of the disclosure is not limited in this respect.

The second plurality of training optical signals have amplitudes varying in a predetermined step. In one embodiment, the predetermined step is in the range of 1% to 10% of the initial amplitude. Of course, any other suitable range is also possible depending on the specific needs and circumstances. Furthermore, the second plurality of training optical signals occupy a common sub-band associated with the first receiver 320, for example occupying the first sub-band S1.

Subsequently, the transmitter 310 receives from the receiver 320 feedbacks for the second plurality of training optical signals from the at least one receiver. The feedbacks have nonlinear modulation characteristics. The transmitter 310 then establishes the time-domain nonlinear mapping based on the nonlinear modulation characteristics of the feedbacks.

According to embodiments of the present disclosure, time-domain nonlinear compensation may be implemented using the interaction of electrical signals with time-domain nonlinear mapping. As a non-limiting implementation, the time-domain nonlinear mapping can be implemented by matrix multiplication, vector multiplication, function transformation, relational table mapping, and the like.

Continue to refer to FIG. 4. In step 470, the frequency-domain multiplexed signals are converted into analog optical signals for transmission. Step 470 corresponds to step 240 in the above, and details are not described herein again.

According to embodiments of the present disclosure, since the nonlinear pre-compensation is performed on the signals to be transmitted at the transmitting side, nonlinear distortion of the signal during transmission is avoided, thereby supporting large-capacity data transmission.

Furthermore, since the nonlinear pre-compensation is performed on the signals to be transmitted at the transmitting side, the optical power required at the receiving side is lower in the case where the same optical signal-to-noise ratio (OSNR) is required. Thereby, the split ratio for the fiber can be increased to deploy more receivers.

As previously mentioned, in accordance with embodiments of the present disclosure, a signal feedback function is incorporated at the receiving side to assist the transmitter in performing nonlinear pre-compensation. A signal feedback process at a receiver in accordance with the present disclosure will be described with reference to FIG. 5. In some embodiments, a method 500 may be implemented, for example, by any of the receivers 130, 140, and 150 in FIG. 1 or by any of receivers 320, 330 and 340 in FIG. 3. It will be appreciated that the method 500 may further comprise an additional step (not shown) and/or the illustrated steps may be omitted. The scope of the embodiments of the present disclosure is not limited in this respect.

Figure 5:
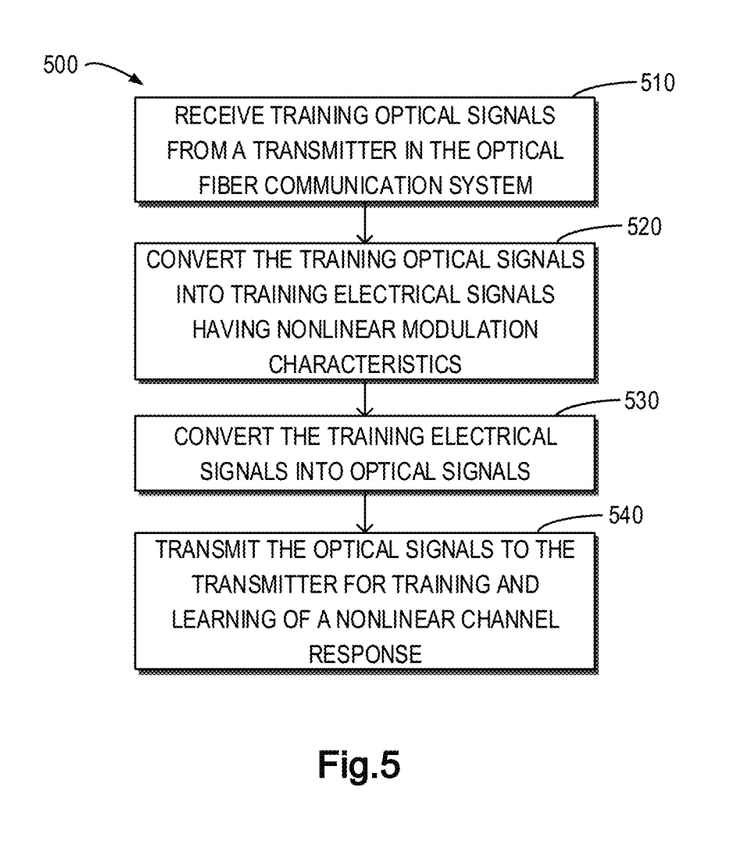
FIG. 5 shows a flow chart of a signal processing method in an optical fiber communication system in accordance with a second aspect of the present disclosure.

As shown in FIG. 5, the method 500 begins in step 510 in which a receiver (e.g., the receiver 320 in FIG. 3) receives training optical signals from the transmitter 310 of an optical fiber communication system.

In step 520, the receiver 320 converts the training optical signals into training electrical signals having nonlinear modulation characteristics. The training optical signals can be converted to the training electrical signals using a direct detection method. This direct detection is a method of demodulation in an optical fiber communication system. This is not limiting, and any method currently known or later developed to convert from an optical signal to an electrical signal can be used in conjunction with embodiments of the present disclosure.

In step 530, the receiver 320 converts the training electrical signals into optical signals. In some embodiments, intensity modulation can be used to convert the training electrical signals to the optical signals. The intensity modulation can be direct modulation or external modulation. Of course, this is only an example. It should be understood that any technique for converting an electrical signal into an optical signal can be used in conjunction with embodiments of the present disclosure, whether currently known or developed in the future.

In step 540, the receiver 320 transmits the optical signals to the transmitter 310 for training and learning of the non-linear channel response.

In some embodiments, the method 500 is implemented to assist the transmitter in performing frequency-domain channel pre-compensation. In such an embodiment, receiving the training optical signals comprises: receiving a first training optical signal for frequency-domain channel pre-compensation, the first training optical signal occupying one sub-band of a transmission bandwidth for the optical fiber communication system In some embodiments, the method 500 is implemented to assist the transmitter in performing time-domain channel pre-compensation. In such an embodiment, receiving the training optical signals comprises: receiving a second plurality of training optical signals for time-domain nonlinear pre-compensation, the second plurality of training signals having amplitudes varying in a predetermined step and occupying one sub-band of a transmission bandwidth for the optical fiber communication system.

According to embodiments of the present disclosure, nonlinear pre-compensation is performed at a transmitter with strong processing capability, and only a signal feedback function is needed at the receiver to assist the transmitter in performing nonlinear pre-compensation. Thus, the receiver needs not to be equipped with a complex and high-cost computing unit such as a digital signal processor (DSP), thereby reducing the cost of deploying the receiver, especially in a distributed small cell system having a super density.

Figure 6:
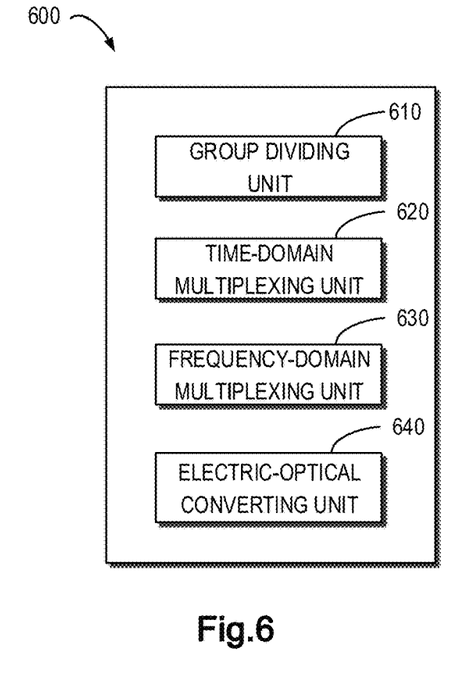
FIG. 6 is a block diagram showing a signal processing device in an optical fiber communication system in accordance with a third aspect of the embodiments of the present disclosure.

FIG. 6 is a block diagram showing a signal processing device 600 in an optical fiber communication system in accordance with a third aspect of the embodiments of the present disclosure. The device 600 comprises a group dividing unit 610, a time-domain multiplexing unit 620, a frequency-domain multiplexing unit 630 and an electric-optical converting unit 640.

The group dividing unit 610 is configured to divide electrical signals for a plurality of receivers in the optical fiber communication system into a plurality of groups, the plurality of groups each being associated with at least one of the plurality of receivers. The time-domain multiplexing unit 620 is configured to obtain time-domain multiplexed signals by multiplexing the electrical signals in the plurality of groups in time domain.

The frequency-domain multiplexing unit 630 is configured to multiplex the time-domain multiplexed signals in the plurality of groups in frequency domain such that the time-domain multiplexed signals occupy respective sub-bands of a transmission bandwidth for the optical fiber communication system. The electric-optical converting unit 640 is configured to convert the frequency-domain multiplexed signals into analog optical signals for transmission. It will be appreciated that the electric-optical converting unit 640 can be a modulator. As a non-limiting implementation, a photodiode or laser is used as the modulation source of the electric-optical converting unit 640.

In some embodiments, the device 600 further comprises a control information transmitting unit that is configured to transmit control information to the at least one of the plurality of receivers, the control information at least indicating frequency-domain resources for transmitting analog optical signals in a sub-band associated with the at least one receiver.

In some embodiments, the control information further indicates time-domain resources for transmitting the analog optical signals in the sub-band associated with the at least one receiver.

In some embodiments, the device 600 further comprises: a frequency-domain channel information obtaining unit configured to obtain frequency-domain channel information associated with the at least one receiver; and a frequency-domain channel pre-compensation unit configured to perform frequency-domain channel pre-compensation on the analog optical signals associated with the at least one receiver using the frequency-domain channel information.

In some embodiments, the frequency-domain channel information obtaining unit is further configured to: transmit a first training optical signal to the at least one receiver, the first training optical signal occupying a sub-band associated with the at least one receiver; receive a feedback for the first training optical signal from the at least one receiver, the feedback having a linear modulation characteristic; and obtain the frequency-domain channel information from the feedback.

In some embodiments, the device 600 further comprises: a mapping establishing unit configured to establish time-domain nonlinear mapping for the electrical signals, the time-domain nonlinear mapping indicating a mapping relationship between measured strengths of the electrical signals and strength compensations; a frequency-domain to time-domain converting unit configured to convert the frequency-domain multiplexed signals from the frequency domain to the time domain to obtain time-domain signals; and a time-domain pre-compensation unit configured to perform time-domain nonlinear pre-compensation on the time-domain signals using the time-domain nonlinear mapping.

In some embodiments, the mapping establishing unit is further configured to: transmit a second plurality of training optical signals to the at least one receiver, the second plurality of training optical signals having amplitudes varying in a predetermined step and occupying one sub-band associated with the at least one receiver; receive feedbacks for the second plurality of training optical signals from the at least one receiver, the feedbacks having nonlinear modulation characteristics; and establish the time-domain nonlinear mapping based on the nonlinear modulation characteristics of the feedbacks.

Figure 7:
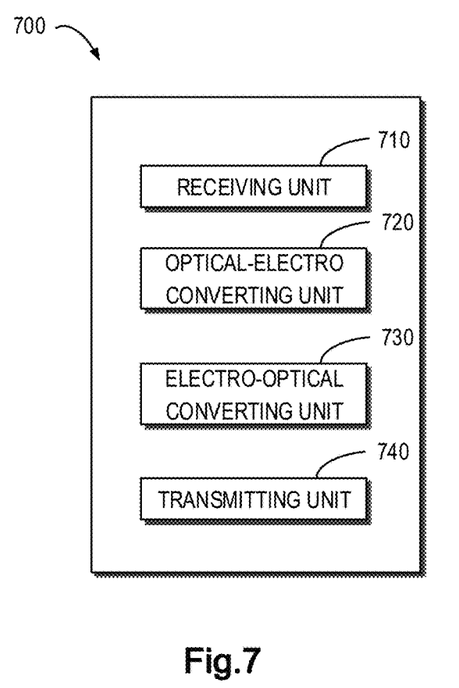
FIG. 7 is a block diagram showing a signal processing device in an optical fiber communication system in accordance with a fourth aspect of the embodiments of the present disclosure.

FIG. 7 is a block diagram showing a signal processing device 700 in an optical fiber communication system in accordance with a fourth aspect of the embodiments of the present disclosure. The device 700 comprises a receiving unit 710, an optical-electro converting unit 720, an electro-optical converting unit 730 and a transmitting unit 740.

The receiving unit 710 is configured to receive training optical signals from a transmitter in the optical fiber communication system. The optical-electro converting unit 720 is configured to convert the training optical signals into training electrical signals having nonlinear modulation characteristics. As a non-limiting implementation, the optical-electro converting unit 720 is implemented using a photodiode.

The electro-optical converting unit 730 is configured to convert the training electrical signals into optical signals. As a non-limiting implementation, the electro-optical converting unit 730 is implemented using a photodiode. The transmitting unit 740 is configured to transmit the optical signals to the transmitter for training and learning of a nonlinear channel response.

In some embodiments, the receiving unit 710 is further configured to receive a first training optical signal for frequency-domain channel pre-compensation, the first training optical signal occupying one sub-band of a transmission bandwidth for the optical fiber communication system.

In some embodiments, the receiving unit 710 is further configured to receive a second plurality of training optical signals for time-domain nonlinear pre-compensation, the second plurality of training signals having amplitudes varying in a predetermined step and occupying one sub-band of a transmission bandwidth for the optical fiber communication system.

Some optional units of devices 600 and 700 are not shown in FIGS. 6 and 7 for purposes of clarity. However, it should be understood that the various features described above with respect to FIGS. 1-5 are equally applicable to devices 600 and 700. Moreover, the various units of devices 600 and 700 can be hardware units or software units. For example, in some embodiments, devices 600 and 700 can be implemented in part or in whole using software and/or firmware, such as a computer program product embodied on a computer readable medium. Alternatively or additionally, devices 600 and 700 may be implemented in part or in whole based on hardware, such as implemented as an integrated circuit (IC), an application specific integrated circuit (ASIC), a system on a chip (SOC), a field programmable gate array (FPGA), or the like. The scope of the disclosure is not limited in this respect.

Figure 8:
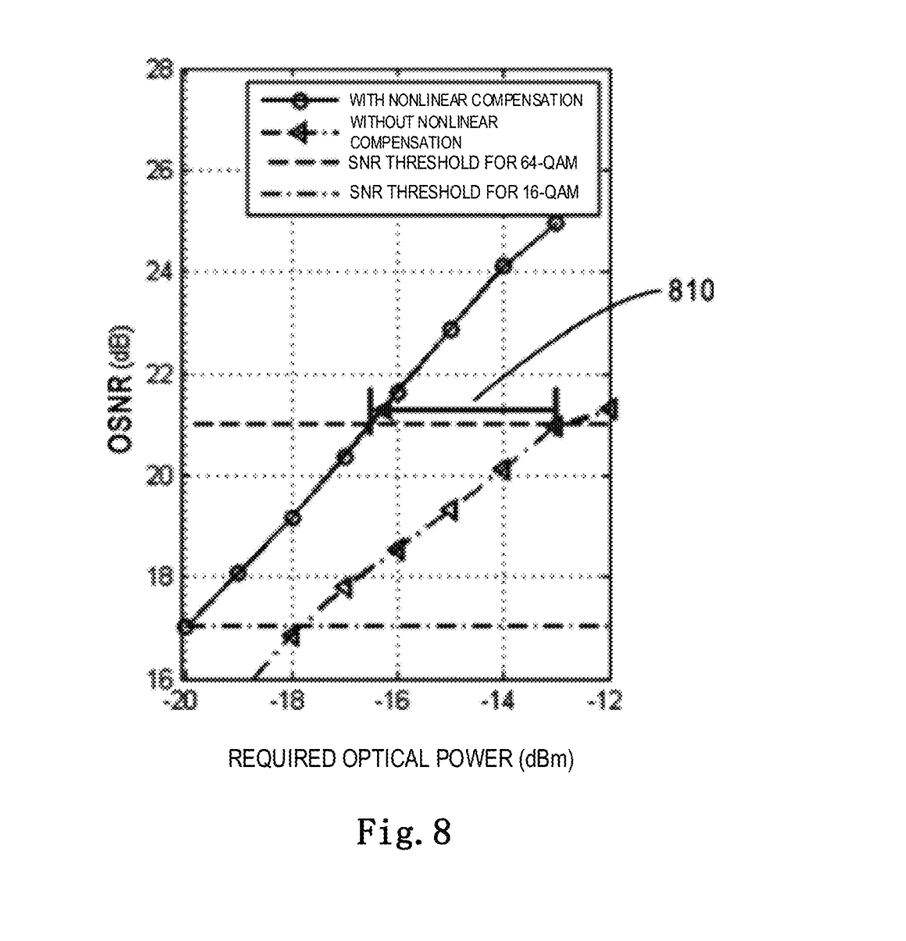
FIG. 8 shows a graph of changes in optical signal-to-noise ratio with respect to required optical power.

Embodiments of the present disclosure are capable of increasing optical signal-to-noise ratio, thereby increasing fiber split ratio to support large capacity data transmission. FIG. 8 shows a plot of the optical signal-to-noise versus the optical power required at the receiver in the cases where nonlinear pre-compensation is used and non-linear pre-compensation is not used.

As can be seen from FIG. 8, after the use of nonlinear pre-compensation, the optical power required at the receiver is lower, as shown at 810, in the event that the same OSNR needs to be obtained. Furthermore, from the perspective of the OSNR (vertical axis), the optical signal-to-noise ratio can be improved by about 3 dB at the same received optical power. Thereby, the fiber split ratio can be increased to deploy more receivers.

As used herein, the term "includes" and its variants are to be read as open terms that mean "includes, but is not limited to". The term "based on" is to be read as "based at least in part on". The term "one embodiment" and "an embodiment" are to be read as "at least one embodiment".

It should be noted that embodiments of the present disclosure may be implemented by hardware, software, or a combination of software and hardware. The hardware portion can be implemented using dedicated logic; the software portion can be stored in memory and executed by a suitable instruction execution system, such as a microprocessor or dedicated design hardware. Those skilled in the art will appreciate that the apparatus and methods described above can be implemented using computer-executable instructions and/or embodied in processor control code, such as in a programmable memory or data carrier such as an optical or electronic signal carrier.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

What is claimed is:

1. A signal processing method in an optical fiber communication system, comprising:
   dividing electrical signals into a plurality of groups of signals for a plurality of receivers in the optical fiber communication system, the plurality of groups of signals each being associated with at least one receiver of the plurality of receivers;
   obtaining time-domain multiplexed signals by multiplexing the electrical signals of the plurality of groups in time domain;
   multiplexing the time-domain multiplexed signals of the plurality of groups in frequency domain such that each of the time-domain multiplexed signals occupy respective frequency sub-bands of a transmission bandwidth for the optical fiber communication system;
   converting the frequency-domain multiplexed signals into analog optical signals for transmission to the plurality of receivers;
   obtaining frequency-domain channel information associated with the at least one receiver; and
   performing frequency-domain channel pre-compensation on the analog optical signals associated with the at least one receiver using the frequency-domain channel information.

2. The method of claim 1, further comprising:
   transmitting control information to the at least one receiver, the control information at least indicating frequency-domain resources for transmitting analog optical signals in a sub-band associated with the at least one receiver.

3. The method of claim 2, wherein the control information further indicates time-domain resources for transmitting the analog optical signals in the sub-band associated with the at least one receiver.

4. The method of claim 1, wherein the obtaining frequency-domain channel information associated with the at least one receiver comprises:
   transmitting a first training optical signal to the at least one receiver, the first training optical signal occupying a sub-band associated with the at least one receiver;
   receiving a feedback for the first training optical signal from the at least one receiver, the feedback having a linear modulation characteristic; and
   obtaining the frequency-domain channel information from the feedback.

5. The method of claim 1, further comprising:
   establishing time-domain nonlinear mapping for the electrical signals, the time-domain nonlinear mapping indicating a mapping relationship between measured strengths of the electrical signals and strength compensations;
   converting the frequency-domain multiplexed signals from the frequency domain to the time domain to obtain time-domain signals; and
   performing time-domain nonlinear pre-compensation on the time-domain signals using the time-domain nonlinear mapping.

6. The method of claim 5, wherein the establishing time-domain nonlinear mapping for the electrical signals comprises:
   transmitting a second plurality of training optical signals to the at least one receiver, the second plurality of training optical signals having amplitudes varying in a predetermined step and occupying one sub-band associated with the at least one receiver;
   receiving feedbacks for the second plurality of training optical signals from the at least one receiver, the feedbacks having nonlinear modulation characteristics; and
   establishing the time-domain nonlinear mapping based on the nonlinear modulation characteristics of the feedbacks.

7. A signal processing device in an optical fiber communication system, comprising:
   circuitry configured to cause the signal processing device to,
      divide electrical signals into a plurality of groups of signals for a plurality of receivers in the optical fiber communication system, the plurality of groups of signals each being associated with at least one receiver of the plurality of receivers,
      obtain time-domain multiplexed signals by multiplexing the electrical signals of the plurality of groups in time domain,
      multiplex the time-domain multiplexed signals of the plurality of groups in frequency domain such that each of the time-domain multiplexed signals occupy respective frequency sub-bands of a transmission bandwidth of the optical fiber communication system,
      convert the frequency-domain multiplexed signals into analog optical signals for transmission to the plurality of receivers, obtain frequency-domain channel information associated with the at least one receiver, and perform frequency-domain channel pre-compensation on the analog optical signals associated with the at least one receiver using the frequency-domain channel information.

8. The signal processing device of claim 7, wherein the circuitry is configured to cause the signal processing device to:

transmit control information to the at least one receiver, the control information at least indicating frequency-domain resources for transmitting analog optical signals in a sub-band associated with the at least one receiver.

9. The signal processing device of claim 8, wherein the control information further indicates time-domain resources for transmitting the analog optical signals in the sub-band associated with the at least one receiver.

10. The signal processing device of claim 7, wherein the circuitry is further configured to cause the signal processing device to:

transmit a first training optical signal to the at least one receiver, the first training optical signal occupying a sub-band associated with the at least one receiver;

receive a feedback for the first training optical signal from the at least one receiver, the feedback having a linear modulation characteristic; and obtain the frequency-domain channel information from the feedback.

11. The signal processing device of claim 7, wherein the circuitry is further configured to cause the signal processing device to:

establish time-domain nonlinear mapping for the electrical signals, the time-domain nonlinear mapping indicating a mapping relationship between measured strengths of the electrical signals and strength compensations;

convert the frequency-domain multiplexed signals from the frequency domain to the time domain to obtain time-domain signals; and perform time-domain nonlinear pre-compensation on the time-domain signals using the time-domain nonlinear mapping.

12. The signal processing device of claim 11, wherein the circuitry is further configured to cause the signal processing device to:

transmit a second plurality of training optical signals to the at least one receiver, the second plurality of training optical signals having amplitudes varying in a predetermined step and occupying one sub-band associated with the at least one receiver;

receive feedbacks for the second plurality of training optical signals from the at least one receiver, the feedbacks having nonlinear modulation characteristics; and establish the time-domain nonlinear mapping based on the nonlinear modulation characteristics of the feedbacks.

\* \* \* \* \*